(12) United States Patent
Komatsu

(10) Patent No.: US 8,361,330 B2
(45) Date of Patent: Jan. 29, 2013

(54) IMAGE MAKING LAMINATES

(75) Inventor: Toshifumi Komatsu, Duluth, MN (US)

(73) Assignee: Ikonics Corporation, Duluth, MN (US)

( * ) Notice: Subject to any disclaimer, the term of this patent is extended or adjusted under 35 U.S.C. 154(b) by 1091 days.

(21) Appl. No.: 12/088,576

(22) PCT Filed: Oct. 2, 2006

(86) PCT No.: PCT/US2006/038276
§ 371 (c)(1),
(2), (4) Date: Sep. 4, 2008

(87) PCT Pub. No.: WO2007/041411
PCT Pub. Date: Apr. 12, 2007

(65) Prior Publication Data
US 2009/0038742 A1 Feb. 12, 2009

Related U.S. Application Data

(60) Provisional application No. 60/722,928, filed on Sep. 30, 2005.

(51) Int. Cl.
*H05B 33/10* (2006.01)
*B44C 1/22* (2006.01)

(52) U.S. Cl. .............. 216/4; 216/41; 216/88; 216/89

(58) Field of Classification Search ............ 216/4, 41, 216/88, 89
See application file for complete search history.

(56) References Cited

U.S. PATENT DOCUMENTS

| | | | | |
|---|---|---|---|---|
| 4,293,603 A | * | 10/1981 | Hayman-Chaffey et al. | 428/201 |
| 4,702,786 A | * | 10/1987 | Tallman | 156/154 |
| 4,828,893 A | * | 5/1989 | Tallman | 428/41.9 |
| 5,686,170 A | * | 11/1997 | Condon et al. | 428/207 |
| 5,779,919 A | * | 7/1998 | DiPietro et al. | 216/4 |
| 5,920,977 A | | 7/1999 | Wyckoff | |
| 5,989,689 A | | 11/1999 | Komatsu | |
| 6,560,841 B1 | | 5/2003 | Letherer et al. | |

FOREIGN PATENT DOCUMENTS

| | | |
|---|---|---|
| JP | 61-141553 | 6/1986 |
| JP | 04-154148 | 5/1992 |
| WO | WO-2006-116223 | 11/2006 |

* cited by examiner

*Primary Examiner* — Shamim Ahmed
(74) *Attorney, Agent, or Firm* — Pauly, Devries Smith & Deffner, L.L.C.

(57) ABSTRACT

A laminate for making signs, the laminate comprising a readily-abraded layer and an abrasion-resistant layer. A method of making signs is also disclosed. The method includes providing a laminate comprising a first layer that is readily etched by abrasives and a second layer disposed beneath the first layer and substantially resistant to abrasive etching. A mask is applied to the top of the laminate; and abrasives are used to selectively remove a portion of the first layer, so as to form a relief image with a controlled and uniform relief depth.

6 Claims, 3 Drawing Sheets

IMAGE MAKING LAMINATES

BACKGROUND OF THE INVENTION

Custom signage articles of all sizes are often made with relief surfaces. Such relief surfaces can have variable depths formed by abrasive etching, acid etching, machining, or other techniques. For example, it is possible to use photoresist layers and abrasives to make an etched surface for use in signs.

Existing methods of producing relief surfaces are often imprecise in terms of controlling surface relief. The equipment operator needs to show great care in controlling relief depth, typically by regulating abrasion rate (controlled by amount of abrasive, size of abrasive, and speed of abrasive particles) as well as duration of time at which an area is exposed to abrasion. These inexact controls can be adequate for some purposes, but are not sufficient for those requiring precise depths of the relief.

An example of a type of signage requiring relatively high depth precision are signs incorporating Braille characters. Braille is a system by which people with limited or no vision can use tactile senses to read letters written in an alphabet of raised dots. Regulations regarding Braille signage are provided by the United States Access Board in the Americans with Disabilities Act (ADA) and Architectural Barriers Act Accessibility Guidelines (Jul. 23, 2004), Section 703. These guidelines state that all raised characters must be a minimum of 1/32" in height above their background and Braille dots must be 0.025-0.037" in height and have a domed or rounded surface. Existing abrasives etching techniques are not generally suitable for precisely producing Braille dots of such height.

Therefore, a need exists for an improved method of making-signage with precise and controlled feature heights, such as Braille characters.

SUMMARY OF THE INVENTION

The present invention is directed to a method of making signs with controlled, precise relief. The invention is suitable, for example, in making signage containing Braille characters.

Certain aspects of the invention are directed to a laminate for making signs having surface relief. The laminate generally includes an abrasion-resistant layer and a readily-abraded layer disposed on top of the abrasion-resistant layer. The readily-abraded layer can be of varying thickness depending upon the application, ranging from a fraction of an inch to thicker than an inch. In some implementations the readily-abraded layer is greater than 0.01 inch thick, in other implementations greater than 0.05 inch, and in yet other implementations greater than 0.1 inch thick. Typical thicknesses for this readily-abraded layer is from 0.1 to 0.5 inches, from 0.2 to 0.4 inches, and from 0.25 to 0.35 inches. When the laminate will be used for Braille signage, the readily-abraded layer is typically of a sufficient thickness that the finished Braille dots will be from about 0.025-0.037 inches thick. In some implementations the laminate further comprises an adhesive layer intermediate the abrasion-resistant layer and the readily-abraded layer. This adhesive layer is substantially resistant to abrasive etching in some implementations of the invention, but is readily etched by abrasives in other implementations.

Suitable abrasion-resistant layers can include, for example, acrylic, polyurethane, polycarbonate, aluminum, metal, hard plastic, and stone. Suitable readily-abraded layers include, for example, fiberglass reinforced polyester, melamine, phenolic laminates, glass, wood, and metal resins composites. It should be noted that the two layers can be the same type of material, so long as one is significantly more readily abraded than the other. For example, two metals can be used as long as the upper metal layer is much more easily abraded than the lower metal layer; or two plastic layers can be used, as long as the upper plastic layer is much more readily-abraded than the lower plastic level.

The invention is also directed to a method of making signs. The signs are made from a laminate having an upper layer that is readily-abraded and a lower layer that is abrasion resistant. The readily-abraded layer is masked with a desirable image or characters, such as by using a photoresist applied to the top of the laminate; and abrasives are used to selectively remove a portion of the readily-abraded layer.

The present invention has a number of advantages, including quickly and precisely making signs having a relief surface with a precise depth. One embodiment includes making Braille signage, and the present invention facilitates compliance with ADA-regulated character and Braille height requirements for signs, also allowing for formation of durable rounded Braille dots.

The above summary of the present invention is not intended to describe each disclosed embodiment of the present invention. This is the purpose of the figures and the detailed description that follow.

BRIEF DESCRIPTION OF THE FIGURES

Other aspects and advantages of the invention will become apparent upon reading the following detailed description and upon reference to the drawing in which.

While the invention is susceptible to various modifications and alternative forms, specifics thereof have been shown by way of example in the figure and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

The present invention is directed to a method of making signs. The method includes etching a laminate having a layer that is substantially resistant to abrasive etching, plus a readily-abraded layer disposed on top of the layer that is abrasion resistant. A photoresist or other mask is applied to the top of the laminate; and abrasives are used to selectively remove a portion of the readily-abraded layer to form a pattern, such as a pattern of Braille characters. Certain aspects of the invention are directed to a laminate for making signs, the laminate comprising a substantially abrasion-resistant layer plus a readily-abraded layer disposed on top of the abrasion-resistant layer. The readily-abraded layer is easily etched by abrasives, such as by sand blasting, but is otherwise durable. For example, this readily-abraded layer can receive frequent tactile contact by persons reading Braille. In some implementations the laminate further comprises an adhesive layer intermediate the readily-abraded and abrasion-resistant layers.

Figure 1:
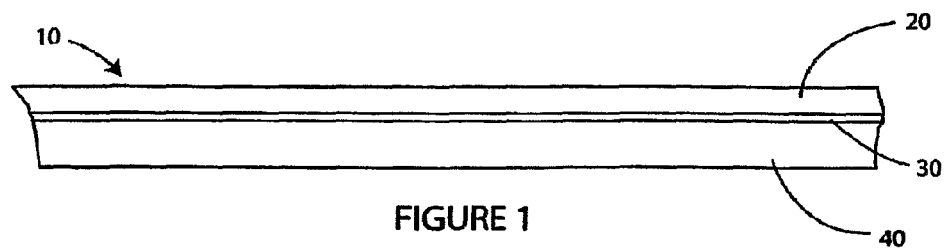
FIG. 1 is a partial side plan view of a laminate constructed and arranged in accordance with the invention, showing the laminate before addition of a photoresist mask layer.

In reference now to the figures, FIG. 1 is a partial a side plan view of a laminated constructed and arranged in accordance with the invention, showing the laminate before addition of a photoresist layer. The laminate 10 includes a readily-abraded layer 20 that is suitable for being partially removed by sandblasting, but is typically otherwise quite durable and is resistant to abrasion, such as from the repeated contact of a person reading Braille. Laminate 10 further includes abrasion-resistant layer 40 that is resistant to abrasive etching. The abrasion-resistant layer 40 is typically at least twice as resistant to abrasive etching as the readily-abraded layer 20, and is sometimes three, four, or more times resistant.

In the depicted embodiment, the readily-abraded and abrasion-resistant layers 20, 40 are held together by an intermediate adhesive layer 30. However, in some alternative embodiments the layers 20, 40 are directly bonded to one another. Also, it will be appreciated that other layers can be added to this laminate, either on the outside of the laminate or between the layers, so long as the core function of making etched Braille signs is preserved.

Figure 2:
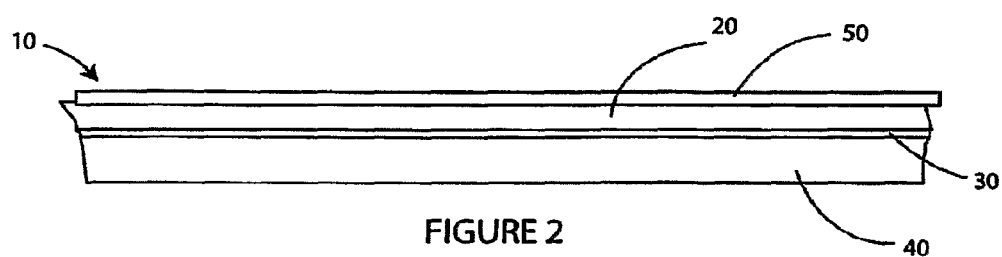
FIG. 2 is a partial a side plan view of a laminate constructed and arranged in accordance with the invention, showing the laminate after addition of a resist layer.

FIG. 2 is a partial side plan view of the laminate 10 constructed and arranged in accordance with the invention, showing the laminate 10 after addition of a resist layer 50 onto readily-abraded layer 20. Resist layer 50 can be added directly to the readily-abraded layer 20, or can be adhered using an adhesive or other method. The resist layer 50 provides selective resistance to etching force, thereby permitting selective etching of areas in the readily-abraded layer 20 beneath the resist layer 50. As noted above, alternatives to the resist layer include other masking techniques, including die-cut and blade-cut films.

Figure 3:
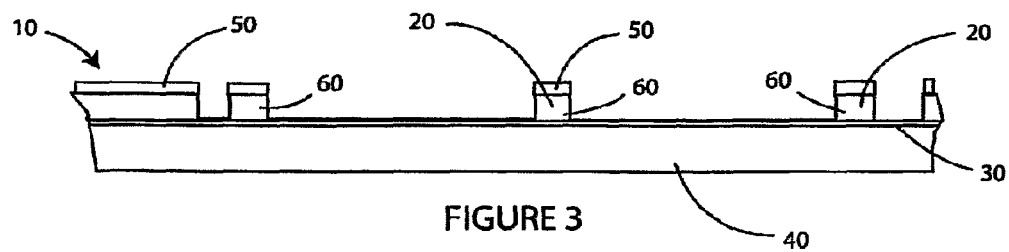
FIG. 3 is a partial side plan view of a laminate constructed and arranged in accordance with the invention, showing the laminate after selectively etching readily-abraded portions of the laminate.
Figure 4:
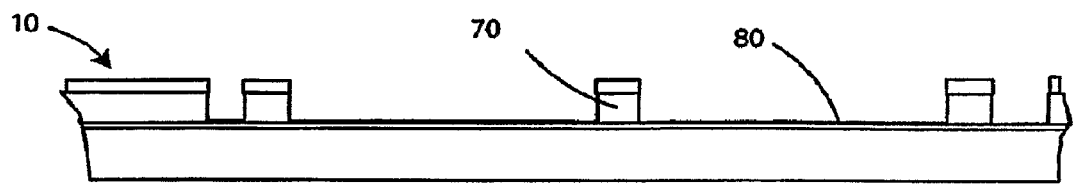
FIG. 4 is a partial a side plan view of a laminate constructed and arranged in accordance with the invention, showing the laminate after selectively etching portions of the laminate, including the readily-abraded layer but not the adhesive layer or the abrasion-resistant layer, and after removal of the photoresist layer.

FIG. 3 is a partial a side plan view of the laminate 10 after selectively etching portions of the laminate 10 using an abrasive. Those portions of laminate 10 that were not protected by the resist layer 50 have been removed, while the protected areas 60 of the readily-abraded layer 20 remain. In the embodiment depicted in FIG. 3, the adhesive layer 30 is itself resistant to abrasive etching. FIG. 4 shows this same laminate 10 after removal of the remaining resist layer 50, leaving a laminate with a multitude of protrusions 70 corresponding to the protected areas 60. These protrusions 70 are all that remains of the original readily-abraded layer 20. In addition, it will be noted that the protrusions 70 rise from a substantially flat and smooth surface 80. This surface 80, corresponds to the adhesive layer 30 or to the abrasion-resistant layer 40.

Figure 5:
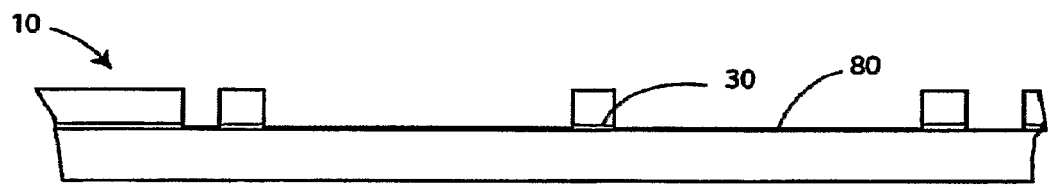
FIG. 5 is a partial side plan view of a laminate constructed and arranged in accordance with the invention, showing the laminate after selectively etching portions of the laminate, including the readily-abraded layer and the adhesive layer, and after removal of the photoresist layer.

FIG. 5 also shows the laminate after selectively etching portions of the laminate, including the top layer and the adhesive layer, and after removal of the photoresist layer, but is an alternative implementation in which the adhesive layer 30 has been removed by etching.

Figure 6:
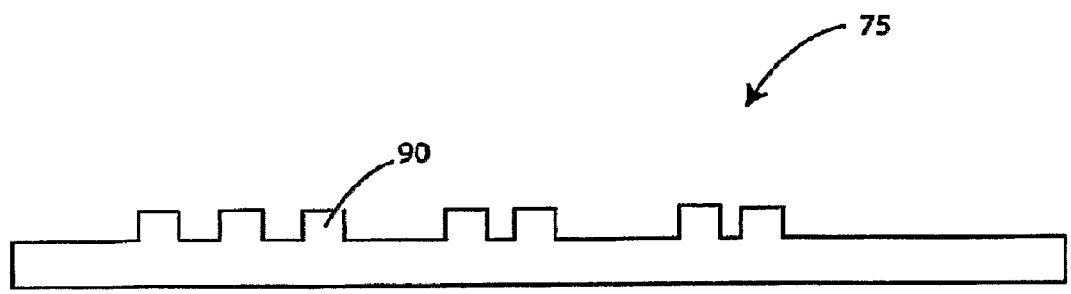
FIG. 6 is a partial side plan view of a laminate constructed and arranged in accordance with the invention, showing relief portions.
Figure 7:
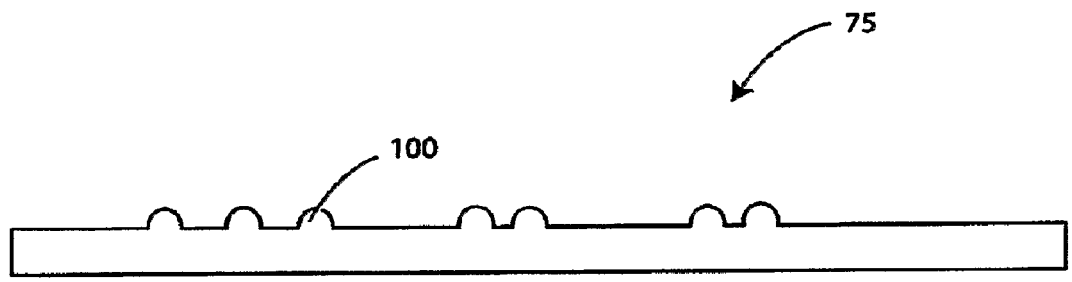
FIG. 7 is a partial side plan view of a laminate constructed and arranged in accordance with the invention, showing rounded relief portions.

An example enlarged cross-sectional view of a Braille panel 75 is shown in FIG. 6, showing a multitude of relief portions 90. These relief portions 90 are generally sharp edged along their top surfaces, but can be converted to rounded relief portions 100 as shown in FIG. 7.

Further aspects of the invention are shown by the following example construction:

| Layers | |
|---|---|
| Sandblastable laminate layer, 20-40 mils thick | (readily-abraded layer) |
| Adhesive Layer, 1-40 mils thick | (adhesive layer) |
| Non-sandblastable layer, 0.125-1 inch thick | (abrasion-resistant layer) |

The readily-abraded layer forms the "front" of the sign and consists of an easily sandblastable material (e.g. fiberglass reinforced polyester or melamine, phenolic laminates, etc.). This readily-abraded layer is, for example when being used to make a Braille sign, at least 1/32" thick, which is the minimum thickness required for relief images by ADA guidelines. By using a material of this thickness, the ADA requirements for image height are met simply by sandblasting through the sandblastable layer to reveal either the adhesive layer non-sandblastable layer.

As used herein, "easily sandblastable" and "readily-abraded" is defined as complete removal of the material in less than 8 minutes by sandblasting of a 6"×8" area using 120 mesh aluminum oxide grit, with a blast pressure of 80 psi at a 5" distance (1/8" nozzle). The adhesive layer is used to bond layers of the laminate. Adhesive requires sufficient cohesive and adhesive strength to prevent separation of the readily-abraded layer and abrasion-resistant layer after sandblasting of the sign is completed. Adhesive can either be removed by sandblasting or can remain intact (to act as the floor for sandblast depth). This layer may be avoided if the readily-abraded and abrasion-resistant layers are permanently joined using other methods not requiring an adhesive (such as bonding under heat or pressure).

The abrasion-resistant layer is used as the support material for the readily-abraded layer and the adhesive layer, and should be sufficiently rigid to provide dimensional stability for the sign. The material for the abrasion-resistant layer should not be easily sandblastable so that it acts as a backstop to prevent further sandblasting depth. Examples include acrylic, polycarbonate, aluminum, various hard plastics, and metals.

Processing of the Sign Laminate

The invention is also directed to a method of making signs, the method comprising providing a laminate comprising a first layer substantially resistant to abrasive etching and a second layer disposed on top of the first layer, wherein the second layer is readily etched by abrasives. A photoresist or other mask is applied to the top of the laminate; and abrasives are used to selectively remove a portion of the first layer based upon the photoresist layer.

In an example embodiment, a sandblast resist film (e.g. 10 mil PBVinyl) is adhered to the surface of the readily-abraded layer. The open areas of the resist film are then sandblasted with a suitable abrasive material (preferably 120-150 mesh) until this layer has been completely removed in those open areas. Depending on the properties of the adhesive used for the adhesive layer, it may either be removed along with the layer above it or it may remain intact and act as the floor. At this point the sign may be spray painted, with the sandblast resist only allowing those areas that were sandblasted to receive the paint. After the paint has dried, or if no painting was performed, the resist material may be removed.

As noted above, one implementation of the invention is to form signage containing Braille dots, including those that are acceptable under the Americans with Disabilities Act ("ADA"). ADA signage includes an area that contains Grade 2 Braille dots, and regulations require that these dots be 0.025-0.037 inches in height and have a domed or rounded shape (ADA 703.3.1). In the process of sandblasting using a resist film, the characters obtain a flat surface. To create the domed surface required by ADA regulations, the resist material is removed from the surface of the raised Braille dots and a short (3-5 seconds) dose of sandblasting is administered. This has the effect of rounding the surface of the Braille dots so that they will comply with the established regulations.

I claim:

1. A method of making signs, the method comprising:
providing a laminate comprising at least two layers: a first layer that is readily etched by abrasives; and an abrasion resistant second layer disposed beneath the first layer;
applying a mask to the top of the laminate, wherein the first layer is in between the mask and the abrasion resistant second layer; and
using abrasive etching to selectively remove a portion of the first layer of the laminate without removing the second layer of the laminate;
removing the mask from the top of the laminate;
wherein the finished laminate contains raised portions of the first layer of the laminate located on top of exposed portions of the abrasion resistant second layer of the laminate.

2. The method of making signs of claim 1, wherein the first layer is less than 0.04 inch thick.

3. The method of making signs of claim 1, wherein the first layer is greater than 0.02 inch thick.

4. The method of making signs of claim 1, further comprising an adhesive layer intermediate the first layer and second layer.

5. The method of making signs of claim 4, wherein the adhesive layer is resistant to abrasive etching.

6. The method of making signs of claim 4, wherein the adhesive layer is readily etched by abrasives.

\* \* \* \* \*